United States Patent [19]

Roy et al.

[11] Patent Number: 4,577,878

[45] Date of Patent: Mar. 25, 1986

[54] FOLDING WHEELCHAIR

[75] Inventors: Jehan Roy; Jean Dubois, both of Tours, France

[73] Assignee: Lacoste, SA, Tours Cedex, France

[21] Appl. No.: 614,787

[22] Filed: May 29, 1984

[30] Foreign Application Priority Data

May 30, 1983 [FR] France ................................ 83 09612

[51] Int. Cl.[4] ................................................ B62B 11/00

[52] U.S. Cl. ............................. 280/242 WC; 280/650; 297/45

[58] Field of Search ............... 280/242 WC, 289 WC, 280/650, 644, 42; 297/42, 44, 45; 16/291, 293, 294

[56] References Cited

U.S. PATENT DOCUMENTS

| | | | |
|---|---|---|---|
| 1,799,029 | 3/1931 | Smith | 297/45 X |
| 2,354,949 | 8/1944 | Ducavich | 297/45 |
| 2,592,405 | 4/1952 | Everest et al. | 297/42 |
| 3,228,724 | 1/1966 | Resar | 297/45 |
| 3,711,151 | 1/1973 | Upton | 297/45 |
| 4,273,350 | 6/1981 | Williams | 280/242 WC |
| 4,343,482 | 8/1982 | Wegner | 297/45 X |

*Primary Examiner*—Joseph F. Peters, Jr.
*Assistant Examiner*—Michael Mar
*Attorney, Agent, or Firm*—Young & Thompson

[57] ABSTRACT

A folding wheelchair comprises a framework, a seat and a backrest mounted on said framework. Two front caster wheels permit steering and two large rear wheels permit propulsion. The framework comprises two symmetrical lateral rectangular frames mounted to be moved away from or brought back toward each other by a jointing device, each lateral rectangular frame comprising at least one lower and one upper horizontal side-bar spaced by one front and one rear vertical side-bar. The jointing device comprises a compass-member having two legs whose outer ends are rotatively mounted around two parallel supporting pins, each of which is disposed within the corresponding lateral frame of the framework. Two pieces of canvas are provided, which are parallelly stretched between the lower and the upper horizontal side-bars of the lateral frames and are located on opposite sides of the compass, one of these pieces of canvas comprising the seat. One of the legs of the compass comprises a shoulder located at a pivotal joint between the legs, the shoulder overlapping and abutting a portion of the end of the other leg when the compass-member is extended, whereby the shoulder limits the extending movement of the compass. The shoulder abuts that other leg when the legs have passed over-center upon extension of the compass, the tension in the canvas preventing unwanted collapse of the compass.

4 Claims, 1 Drawing Figure

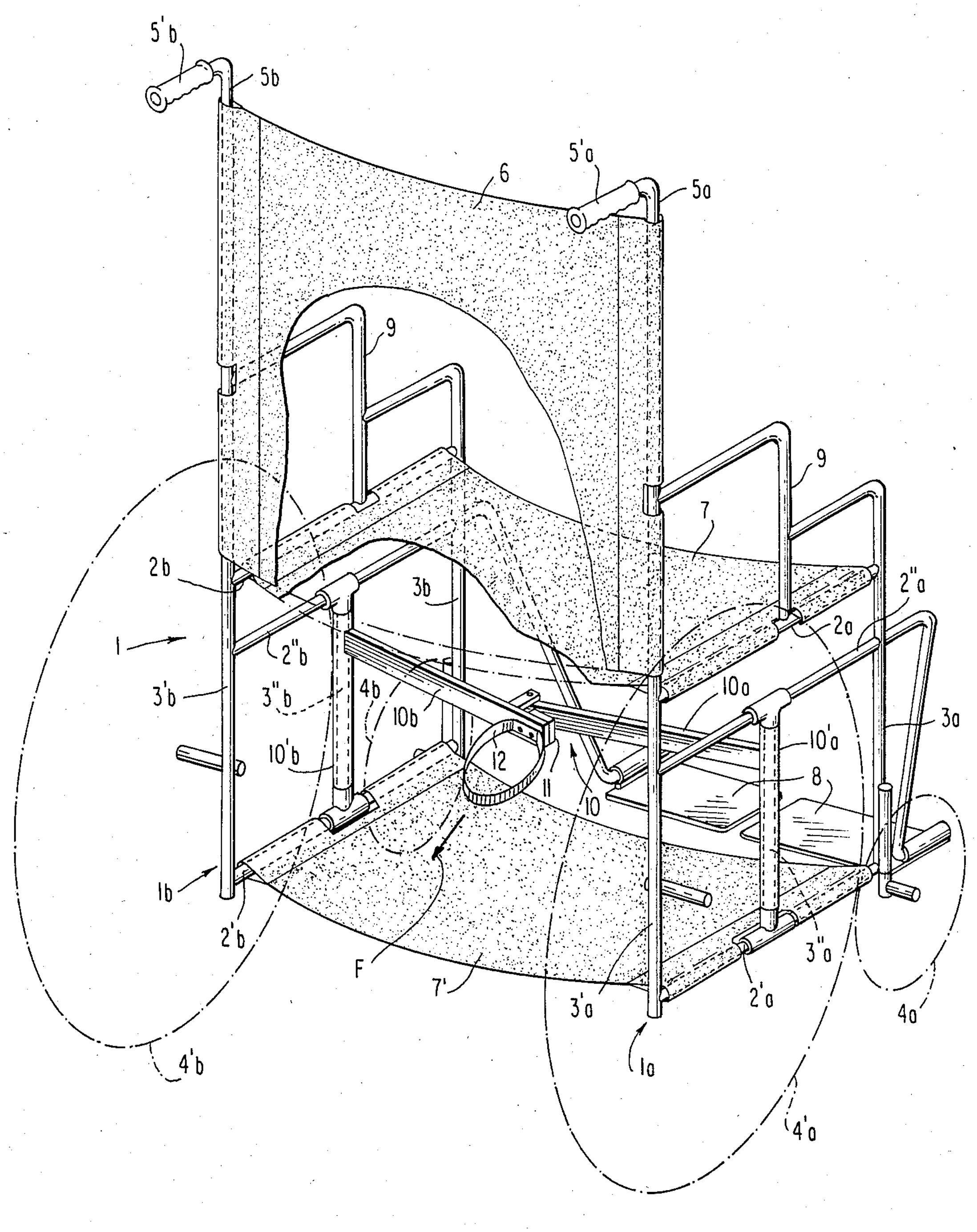
5'b
5b
6
5'a
5a
9
9
7
2b
3b
2"a
2a
1
2"b
3'b
3"b
4b
10b
10a
3a
10'a
10'b
12
11
10
8
1b
2'b
F
7'
3'a
2'a
3"a
4a
1a
4'b
4'a

FOLDING WHEELCHAIR

The present invention relates to the transportation of disabled or invalided persons and more particularly relates to folding wheelchairs.

Folding wheelchairs generally comprise a framework bearing a backrest and a seat and having two front caster wheels permitting steering and two large rear wheels permitting propulsion, said framework comprising two symmetrical lateral rectangular frames. Said lateral frames are mounted to be moved away from each other (unfolded position for the use of the wheelchair) or brought back toward each other (folded position for the storing of the wheelchair), with the object of reducing the dimensions of the chair when not in use.

Each of said frames comprises one upper and one lower horizontal side-bar spaced by means of one front and one rear vertical side-bar. Both frames are joined together by means of a jointing device, conventionally a cross-piece whose four free ends are rotatively and respectively mounted around four axes parallel to the four horizontal members of the lateral frames of said framework.

The major drawback of folding wheelchairs of this kind is their heavy weight. In addition to the appreciable weight of the cross-pieces, this jointing device requires the presence of a system for accomodating the differences in the level between the two upper horizontal side-bars and the two lower horizontal side-bars of said two lateral frames when folding or unfolding the framework. Said system usually comprises telescopic plungers fitting into the vertical side-bars, which consequently makes heavier the framework and complicates the handling of the wheelchair.

As the result of thorough research, the applicants have created a wheelchair which overcomes these drawbacks. It is consequently an object of the invention to provide a folding wheelchair having a novel jointing device for the two lateral frames of the framework of the kind described above.

The jointing device of the invention comprises a compass-member having two legs whose free ends are combined with sleeves rotatively mounted around two supporting pins, said supporting pins being parallel one to the other and to the vertical side-bars of the two frames and being preferably located on the first rear third of said side-bars.

It is to be clearly understood that the weight differential between the jointing device with a compass-member and the jointing device with a cross-piece is very important. In addition, the set of plungers of the prior art is replaced by a much lighter system allowing a secure bearing of the framework on the ground. To this end, two pieces of canvas are parallelly stretched between each set of lateral frames (upper and lower) on each side of the jointing device with the compass-member. Said two pieces of canvas make alterable parallelograms with the two lateral frames.

The wheelchair of the invention consequently offers the advantages as follows: simple and compact structure, reliability of use resulting from the elementary handling operations, compactness when folded, and a reduction of the weight of the framework by 50 percent compared to foldable wheelchairs marketed so far.

Although the aspects of this invention which are considered to be novel are expressed in the appended claims, further details as to preferred practices and as to further features thereof may be most readily comprehended through reference to the following detailed description when taken in connection with the accompanying drawing, wherein the single FIGURE is a rear perspective view of the wheelchair of the invention.

Having reference to the drawing, a wheelchair is shown, which comprises a framework 1 constituted by two rectangular lateral frames 1*a*, 1*b*, adapted to be moved away from each other or brought back toward each other. Each of said lateral frames 1*a* and 1*b* comprises one upper and one lower horizontal side-bar (2*a*, 2*b*, 2'*a*, and 2'*b*, respectively) spaced apart by means of one front and one rear vertical sidebar (3*a*, 3*b*, 3'*a*, and 3'*b*, respectively).

Said framework 1 is mounted on two front caster wheels 4*a* and 4*b*, permitting steering and on two large rear wheels 4'*a* and 4'*b*, permitting propulsion. The rotational axles of said front caster wheels 4*a* and 4*b* are mounted on the front vertical side-bars 3*a* and 3*b*, respectively, while the rotational axles of said large rear wheels are mounted on the rear vertical side-bars 3'*a* and 3'*b*, respectively.

It will be seen that the two rear vertical side-bars 3'*a* and 3'*b* of the framework extend upward as two tubular members 5*a* and 5*b* whose upper ends bear handles 5'*a* and 5'*b*, respectively. The backrest and the seat of the wheelchair defining the seating position of the invalid comprise two pieces of canvas, 6 and 7. Each of the pieces of canvas is stretched between the tubular members 5*a* and 5*b* for the backrest, and between the upper horizontal side-bars 2*a* and 2*b* of the framework 1 for the seat. It is to be clearly understood that the wheelchair of the invention may be provided with optional features usually found on conventional wheelchairs, such as a foot-rest 8, arm-rests 9, etc . . . .

According to an important feature of the invention, connection of the two lateral frames 1*a* and 1*b* is provided by means of a jointing device 10 permitting folding or unfolding the wheelchair when the two lateral frames are brought back together or moved away from each other. Said jointing device comprises a compass-member having two legs 10*a* and 10*b* whose free ends are secured to sleeves, 10'*a* and 10'*b*, respectively, rotatively mounted around two supporting pins, 3"*a* and 3"*b*, said supporting pins being vertical and parallel, and being preferably located on the first rear third of said frames 1*a* and 1*b*. The location on the "first rear third" of said vertical supporting pins 3"*a* and 3"*b* is preferred because of the center of gravity of the wheelchair when supporting the invalid and so as to strengthen the framework 1. To consolidate the structure of the two lateral frames 1*a* and 1*b*, each of said vertical supporting pins, 3"*a* and 3"*b*, is rigidly locked with the corresponding lower horizontal side-bar, 2'*a* and 2'*b*, respectively, and with the corresponding of two supplementary horizontal side-bars, 2"*a* and 2"*b*, located under the upper horizontal side bars 2*a* and 2*b*. Sleeves 10'*a* and 10"*b* extend substantially the full height of pins 3"*a* and 3"*b*.

According to a preferred embodiment of the invention, a second piece of canvas 7' parallel to the piece of canvas of the seat 7, is stretched between the two lower horizontal side-bars 2'*a* and 2'*b* of the framework. Thus, when the jointing device 10 with the compass-member is in the position shown in the drawing, the spacer structure between the two lateral frames 1*a* and 1*b* provided by the two substantially aligned legs 10*a* and 10*b* of the compass-member, is further strengthened by the tension of the two pieces of canvas 7 and 7' whose material has been selected to support the stress due to stretching while it offers comfort to the occupant of the seat 7.

According to a further advantageous feature of the invention, the leg 10*b* of the jointing device with the compass-member is provided with a shoulder 11 overlapping a portion of the end of the other leg 10*a* when said legs are extended. It is to be clearly understood that this overlapping aims at limiting the angular swinging of the two legs 10*a* and 10*b* in a direction opposite to the arrow F. It is to be understood that the drawing shows the parts in the position they occupy when collapsing movement of the compass in the direction of arrow F has just begun. In the fully extended position of the compass, the tension of the canvas prevents unwanted collapse because the legs 10*a* and 10*b* have passed overcenter beyond a parallel position, until shoulder 11 contacts leg 10*a*.

The invention also provides a pull handle 12 on the leg 10*b* to ensure easy folding operations when folding the compass-member 10. This pull handle permits exerting a traction in the direction indicated by arrow F. The second leg 10*a* may also be provided with a handle permitting a traction in the direction opposite to that of arrow F and allowing the unfolding of the wheelchair when opening said compass-member.

It should be understood that the specific embodiments and practices described in connection with this specification have been presented by way of illustration rather than limitation, and that various modifications, combinations and substitutions may be effected by those skilled in the art without departure either in spirit or scope from this invention in its broader aspects and as set forth in the appended claims.

What we claim is:

1. A folding wheelchair comprising a framework, a seat and a backrest mountd on said framework, two front caster wheels permitting steering and two large rear wheels permitting propulsion, said framework comprising two symmetrical rectangular side frames mounted to be moved away or brought back by means of a jointing device, each of said rectangular side frames comprising at least one lower and one upper horizontal sidebar spaced by means of one front and one rear vertical side-bar, said jointing device comprising a compass-member having two legs whose outer ends are rotatively mounted around two parallel supporting pins, each of which is disposed within the corresponding side frame and said framework parallel to and spaced between two of said parallel side-bars of the associated said side frame, the inner ends of said legs being pivotally interconnected by a joint, two pieces of canvas, said two pieces being parallelly stretched between the lower and the upper horizontal side-bars of said side frames, said two pieces of canvas being located on opposite sides of the compass-member and one of said pieces of canvas comprising said seat, one of said legs of the compass-member of the jointing device comprising a shoulder located at the joint, said shoulder overlapping a portion of the end of the other leg when the compass is extended, whereby said shoulder limits the extending movement of the compass-member, said shoulder abutting said other leg when said legs have passed overcenter upon extension of the compass-member, the canvas of said seat being tensioned in the extended position of the compass-member, the tension in the canvas preventing unwanted collapse of the compass-member.

2. A folding wheelchair as set forth in claim 1, wherein said two supporting pins of the jointing device with the compass-member are disposed parallel to the vertical side-bars of said side frames.

3. A folding wheelchair as set forth in claim 1, wherein the free ends of the legs of the compass-member are rotatively mounted around the two supporting pins by means of sleeves, said sleeves being perpendicular to said free ends and surrounding said supporting pins.

4. A folding wheelchair as set forth in claim 1, wherein one of said legs of the compass-member of the jointing device comprises a pull handle.

* * * * *